US012246463B2

(12) United States Patent
Galanis et al.

(10) Patent No.: US 12,246,463 B2
(45) Date of Patent: Mar. 11, 2025

(54) BENT BLADE WITH IMPROVED RIGIDITY

(71) Applicant: BIC VIOLEX S.A., Anoixi (GR)

(72) Inventors: Christos Galanis, Anoixi (GR); Charalampos Schizas, Anoixi (GR); Christos Ampatis, Anoixi (GR)

(73) Assignee: BIC Violex Single Member S.A., Anoixi (GR)

(*) Notice: Subject to any disclaimer, the term of this patent is extended or adjusted under 35 U.S.C. 154(b) by 506 days.

(21) Appl. No.: 17/426,812

(22) PCT Filed: Feb. 28, 2020

(86) PCT No.: PCT/EP2020/055321
§ 371 (c)(1),
(2) Date: Jul. 29, 2021

(87) PCT Pub. No.: WO2020/174091
PCT Pub. Date: Sep. 3, 2020

(65) Prior Publication Data

US 2022/0088813 A1 Mar. 24, 2022

(30) Foreign Application Priority Data

Feb. 28, 2019 (EP) .................................... 19160012

(51) Int. Cl.
*B26B 21/56* (2006.01)

(52) U.S. Cl.
CPC .................................. *B26B 21/565* (2013.01)

(58) Field of Classification Search
CPC ....... B26B 21/565; B26B 21/58; B26B 21/60; B26B 21/54
USPC ... 30/346.5, 346.53, 346.54, 346.55, 346.58, 30/346.59, 350
See application file for complete search history.

(56) References Cited

U.S. PATENT DOCUMENTS 9,868,221 B2 1/2018 Van Eibergen Santhagens
10,500,745 B2 * 12/2019 Davos .................. B26B 21/227
10,981,286 B2 * 4/2021 Efthimiadis .......... B26B 21/565
(Continued)

FOREIGN PATENT DOCUMENTS

EP 2397281 B1 7/2014
EP 2004365 B1 5/2018
(Continued)

OTHER PUBLICATIONS

International Search Report and Written Opinion in International Application No. PCT/EP2020/055321, dated May 6, 2020 (14 pages).

*Primary Examiner* — Phong H Nguyen
(74) *Attorney, Agent, or Firm* — Bookoff McAndrews, PLLC

(57) ABSTRACT

The present disclosure relates to a method of forming a razor blade and a razor blade. The razor blade extends along a longitudinal axis and comprises a cutting edge portion positioned along a second plane, a base portion positioned along a first plane that is different from the second plane, the first plane intersects the second plane at an angle. The razor blade further comprises a bent portion intermediate to the cutting edge portion and base portion, and an extended portion extending from the base portion away from the second plane. The cutting edge portion, base portion, bent portion, and extended portion are monolithically formed.

20 Claims, 4 Drawing Sheets

(56) References Cited

U.S. PATENT DOCUMENTS

| | | | | |
|---|---|---|---|---|
| 2005/0172489 | A1* | 8/2005 | Aviza .................. | B26B 21/4068 30/32 |
| 2010/0077618 | A1 | 4/2010 | Peterson | |
| 2011/0162208 | A1* | 7/2011 | Wain ..................... | B26B 21/521 30/84 |

FOREIGN PATENT DOCUMENTS

| | | | |
|---|---|---|---|
| EP | 3187315 | B1 | 5/2020 |
| WO | 9111300 | A1 | 8/1991 |
| WO | 2010037078 | A1 | 4/2010 |
| WO | 2011062881 | A1 | 5/2011 |
| WO | 2013050606 | A1 | 4/2013 |
| WO | 2018007131 | A1 | 1/2018 |

* cited by examiner

[Fig. 1A]
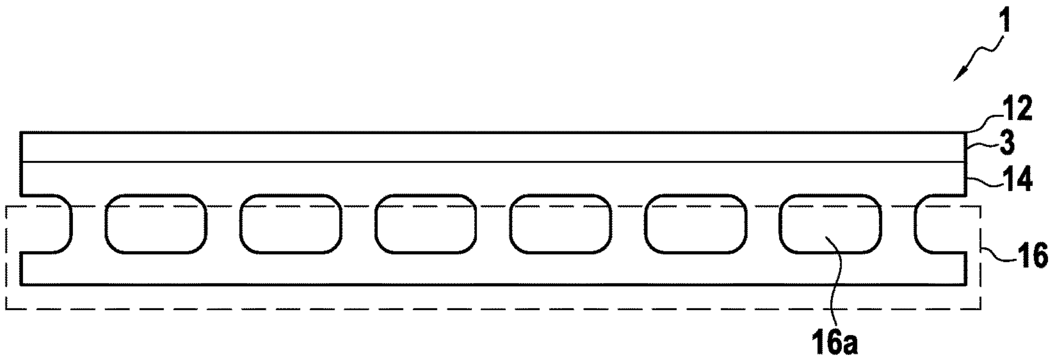
PRIOR ART
[Fig. 1B]
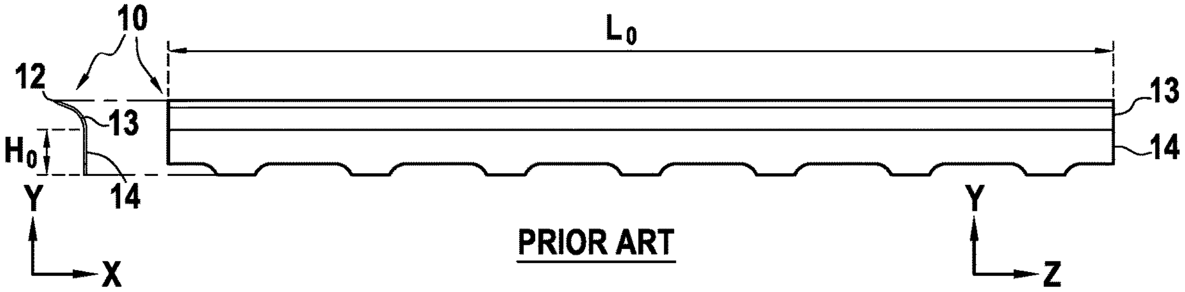
PRIOR ART

[Fig. 2A-2D]
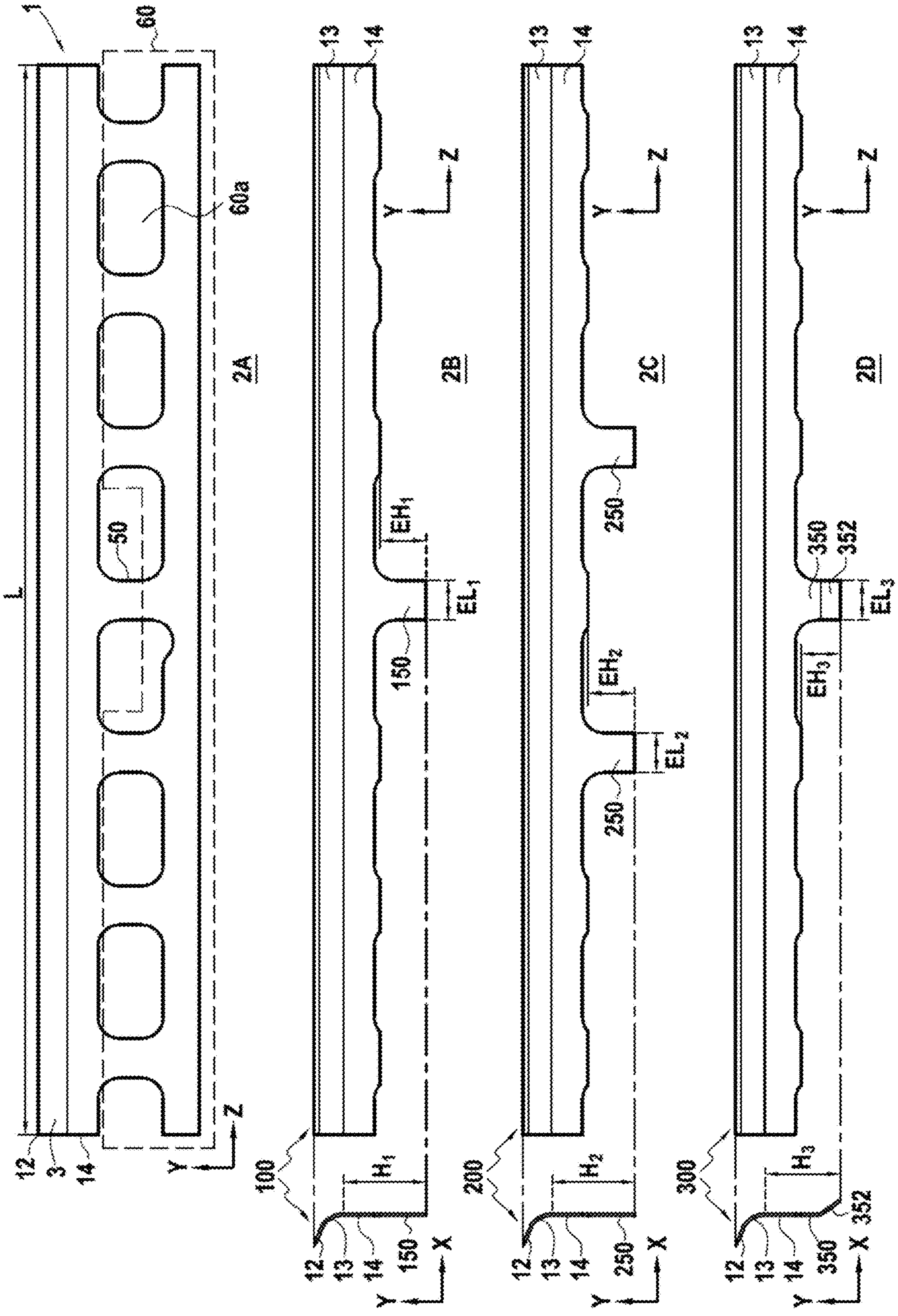

[Fig. 3A-3B]
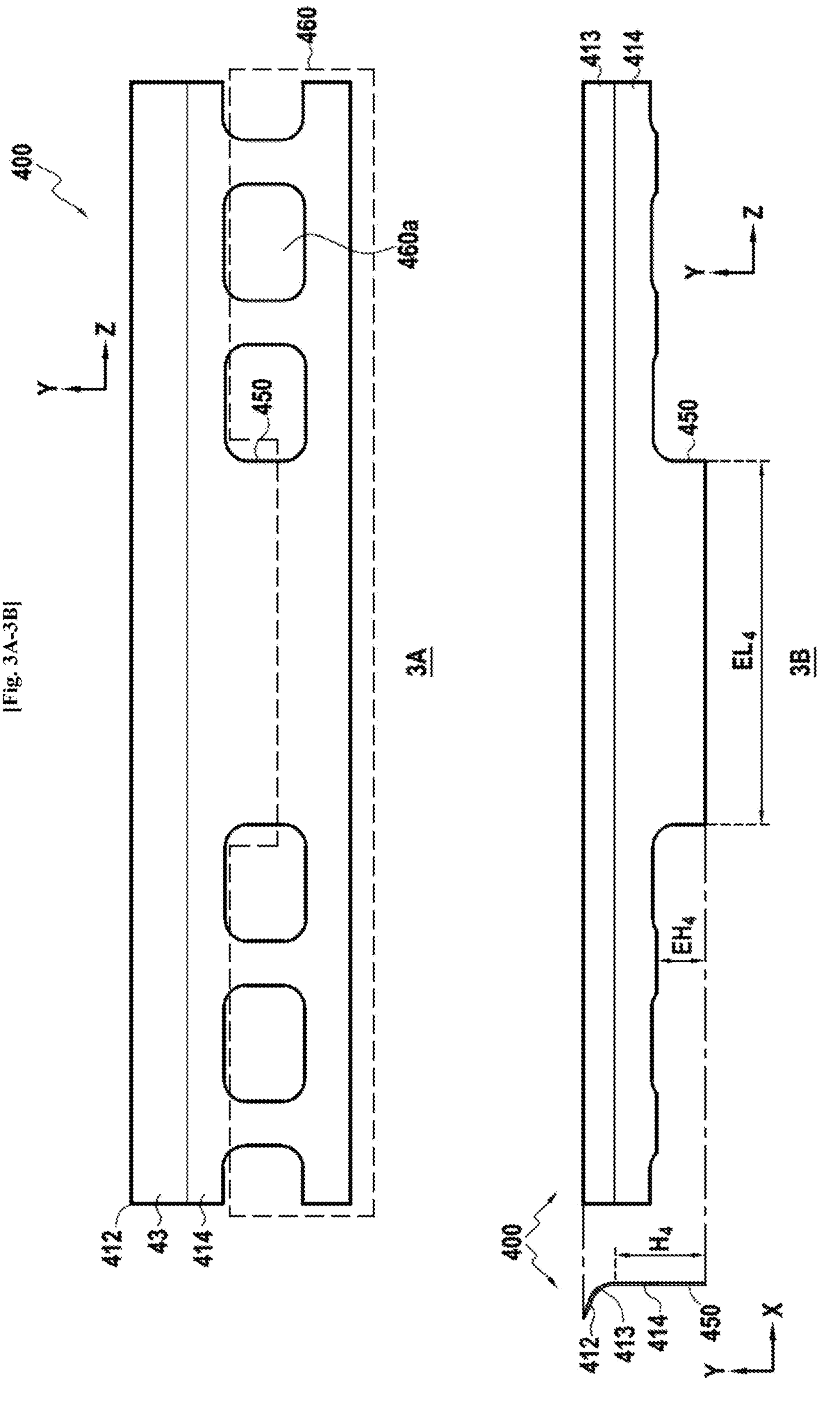

[Fig. 4A-4B]
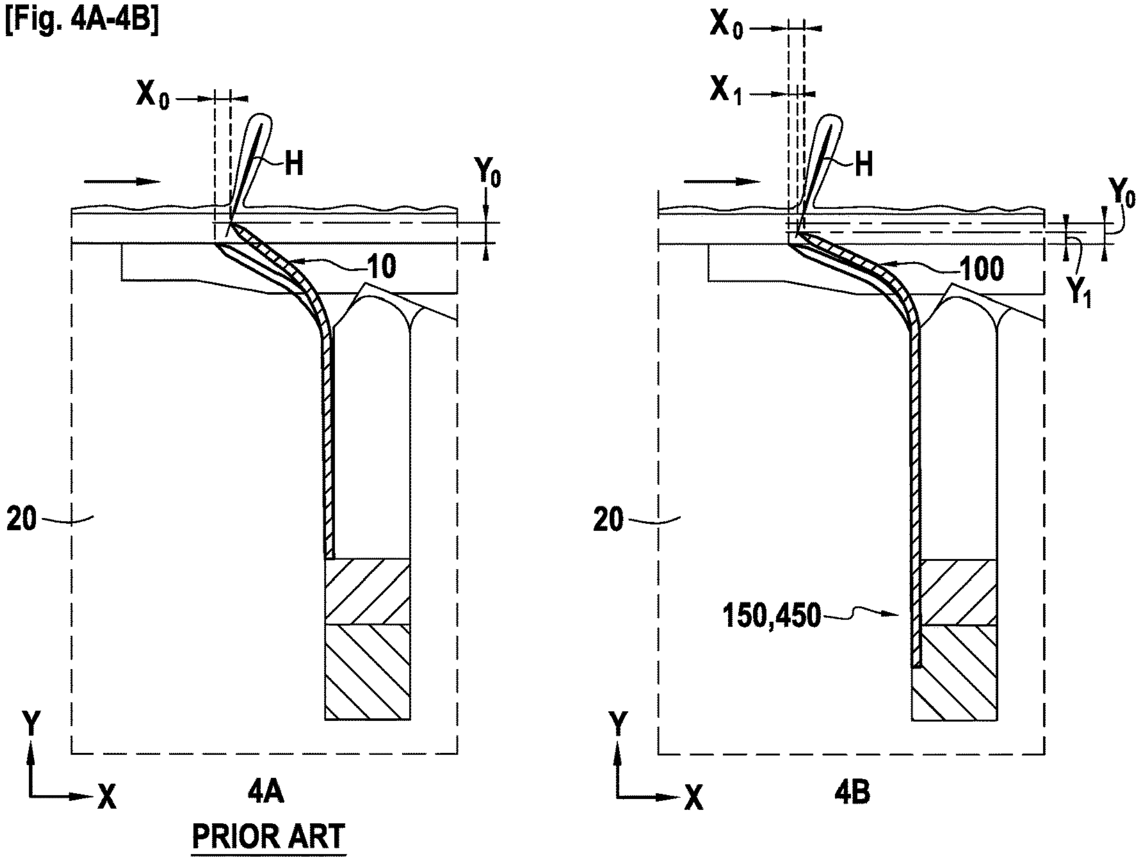
[Fig. 5]
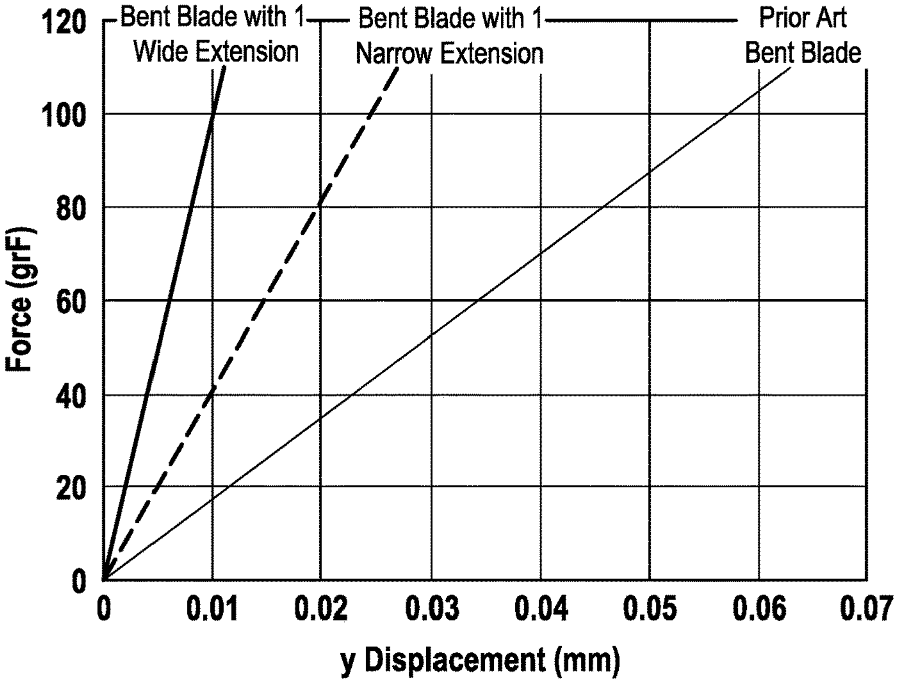

BENT BLADE WITH IMPROVED RIGIDITY

CROSS REFERENCE TO RELATED APPLICATION(S)

This application is a National Stage Application of the International Application No. PCT/EP2020/055321, filed on 28 Feb. 2020, now published as WO/2020/174091, and which claims priority to European Patent application EP 19160012.1 filed on 28 Feb. 2019, entitled "BENT BLADE WITH IMPROVED RIGIDITY", the entire contents of which are incorporated herein by reference.

BACKGROUND

1. Field

The following description relates to bent blades, particularly to razor cartridges comprising such bent blades.

2. Description of Related Art

Shaving devices generally include a head unit having at least one or more cutting members or blades retained therein. The at least one or more cutting members or blades have cutting edges that are aligned in parallel when retained within the head unit.

Some known shaving devices incorporate bent blades as cutting members. In comparison to blades welded on blade supports, bent blades increase rinsability, are more cost-efficient to produce (less material used, less process steps) and their shaving performance is quite comparable.

However, since bent blades use less material (less volume and cross-sectional area) compared e.g. to typical blades welded on a blade support, bent blades tend to elastically deflect more than the blades welded on a blade support when subject to the same shaving force.

To address the deflection issues with bent blades, prior cartridge designs for bent blades are provided with additional protrusions receiving the bent blade near or at the middle region of the blades, thus providing additional support and minimizing blade deflection. In circumstances, a bent blade may have a tendency to deflect towards the back of the razor (i.e. across x-direction parallel to the shaving plane) and at the same time the edge may be displaced or deflected towards the skin area (i.e. across y-direction that is vertical to the shaving plane). These deflections may result in poor shaving performance, e.g. less closeness, less hair pull out force and/or less nicks and cuts and irritation. This may result in an increased wear of the blade edge.

Nevertheless, although these extra supports minimized the x-direction deflection, the y-direction deflection, although it was also decreased, was not as rigid as the blades welded on a blade support.

It is therefore desirable to decrease the y-direction deflection of a bent blade and to decrease overall blade deflection during shaving.

SUMMARY

The present disclosure provides a razor blade extending along a longitudinal axis. The blade comprises a cutting edge portion positioned along a second plane, a base portion positioned along a first plane that is different from the second plane, the first plane intersects the second plane at an angle. The razor blade further comprises a bent portion intermediate to the cutting edge portion and base portion, and an extended portion extending from the base portion away from the second plane. The cutting edge portion, base portion, bent portion, and extended portion are monolithically formed.

The extended portion may have a length along the longitudinal axis that is between 0.035 and 0.9 of a length of the razor blade along the longitudinal axis.

The extended portion may have a length along the longitudinal axis that may be between 0.05 and 0.2 the length of the razor blade along the longitudinal axis.

The extended portions may have an approximate length along the longitudinal axis of 12 mm.

The extended portion may extend away from the base portion a distance that is within a range of 0.5 mm to 7 mm, specifically of 1 mm to 7 mm, more specifically of 1 mm to 3 mm, even more specifically of 1.2 mm to 3 mm and even more specifically about 1.6 mm.

A total height of the base portion and the extended portion may be within a range of 1.0 mm to 12 mm, specifically of 2 mm to 12 mm, more specifically of 2 mm to 5 mm and even more specifically about 3 mm.

The extended portion may be centered along the length of the razor blade along the longitudinal axis.

The razor blade may comprise two extended portions.

Each of the extended portions may be offset from the center of the length of the razor blade along the longitudinal axis.

At least one of the extended portions may have an approximate length along the longitudinal axis of 1.4 mm.

The extended portion may be positioned along the first plane.

The extended portion may include a shaped portion. In some examples, the shaped portion may be positioned along a third plane that is different from the second plane.

A method of manufacturing a razor blade comprises: providing a strip having a cutting edge portion, a base portion, a bent portion intermediate to the cutting edge portion and base portion, an extended portion, and a removable portion. Perforations are provided along the length of the strip positioned within the removable portion and adjacent to the extended portion and to the base portion. The method further includes separating the removable portion from the base portion and the extended portion by cutting the strip at a point where the removable portion starts.

The method may further comprise forming the extended portion to include a shaped portion. I some examples, the shaped portion may be formed by stamping. In others it may be formed by bending the shaped portion along a plane that is different from a plane along which the extended portion extends. In examples, the shaped portion may be formed by stamping and bending.

The proposed disclosure provides bent blade designs that comprise one or more blade body extensions provided at the back portion, the extended portion. These extensions provide extra blade material that increases the cross-sectional area of the blade thereby acting against deflection. In some examples, the extensions increase the cross-sectional area at (or close to) the central region of the blade, which in circumstances may be the portion of the blade that may be the most sensitive to deflection. The proposed disclosure provides for bent blades that are more rigid and better able to withstand the hair cutting forces during shaving. The blade edge of these improved blades deflects less than the ones disclosed in the prior art, especially in the y-direction. This decreased deflection results in a more efficient shaving because the blades can penetrate the hairs more easily, thus reducing the cutting forces and minimizing a hair-pulling effect. It also provides a more comfortable shaving experience. Further, skin safety is also enhanced, by minimizing skin irritation, nicks, and cuts. In addition, the cartridge housing does not need any further cumbersome component to be provided in order to further reduce blade deflection.

BRIEF DESCRIPTION OF THE DRAWINGS

FIG. 1A shows a front view of a prior art blade strip prior to forming and separation of the removable portion.

FIG. 1B shows front and side views of a prior art bent blade formed from the blade strip of FIG. 1A.

FIG. 2A shows a front view of another blade strip prior to forming and separation of the removable portion.

FIG. 2B shows front and side views a bent blade formed from the blade strip of FIG. 2A.

FIG. 2C shows front and side views of another bent blade after forming.

FIG. 2D shows front and side views of another bent blade formed from the blade strip of FIG. 2A.

FIG. 3A shows a front view of another blade strip prior to forming and separation of the removable portion.

FIG. 3B shows front and side views the bent blade formed from the blade strip of FIG. 3A.

FIG. 4A shows a side view of the bent blade of FIG. 1B assembled into a blade cartridge having a hair force applied on it.

FIG. 4B shows a side view of the bent blade of FIG. 2B assembled into a blade cartridge having a hair force applied on it.

FIG. 5 shows a graph depicting Finite Element Analysis strength test results of various bent blades.

DETAILED DESCRIPTION

FIG. 1A shows a conventional blade strip 1 that will be formed into a bent blade 10. The blade strip 1 may be disposed along a first plane and comprise a cutting edge portion 12 that is positioned along the longitudinal length of the blade strip 1. The cutting edge portion 12 is configured to cut hair. The blade strip 1 may include a base portion 14 that is configured to connect with a razor cartridge (not shown). The blade strip 1 may include a bendable portion 3 intermediate to the cutting edge portion 12 and the base portion 14. The bendable portion 3 is configured to be bent into a bent portion 13. The blade strip 1 further includes a removable portion 16. The removable portion 16 includes a plurality of perforations or weakening holes 16*a*. The blade strip 1 may be composed of stainless steel The cutting edge portion 12, bendable portion 3, base portion 14, and removable portion 16 may be monolithically formed.

When making a bent blade 10 from the blade strip 1, the bendable portion 3 of the blade strip 1 is bent such that the cutting edge portion 12 is positioned along a second plane that intersects the first plane and the base portion 14 is positioned along the first plane. Subsequently, the removable portion 16 is cut away from or broken off of the base portion 14 via the perforations 16*a*.

FIG. 1B details front and side views of a conventional bent blade 10 formed from blade strip 1. Bent blade 10 includes the cutting edge portion 12, base portion 14, and bent portion 13 that is intermediate to the cutting edge portion 12 and base portion 14 each of which extend along a length L of the blade 1. The cutting edge portion 12 may comprise a cutting edge and a flat portion (not shown separately in figures). The base portion 14 has a height H0 measured in the y-direction in a range of 0.5 to 5 mm.

FIG. 2A shows a blade strip 1. The blade strip 1 shown in FIG. 2A is different from blade strip 1 shown in FIG. 1A in that an extended portion 50 that is positioned along the first plane and extends from the center of the base portion 40, is not included in the removable portion 60. Thus, the extended portion 50 will not be removed during forming. The cutting edge portion 12, bendable portion 3, base portion 14, and extended portion 50 may be monolithically formed.

When making the bent blade 100 from the blade strip 1, the bendable portion 3 of the blade strip 1 is bent such that the cutting edge portion 12 is positioned along a second plane that intersects the first plane and base portion 14 is positioned along the first plane. Subsequently, the removable portion 60 is cut away from or broken off of the base portion 14 via the perforations 60*a* such that the extended portion 50 remains attached to the base portion 14.

FIG. 2B details front and side views the bent blade 100 formed from blade strip 1. Bent blade 100 includes the cutting edge portion 12, base portion 14, bent portion 13 that is intermediate to the cutting edge portion 12 and base portion 14, and extended portion 150 extending from the base portion 14 away from the cutting edge portion 12. The extended portion 150 extends from the center of the length L of the blade 100 to minimize deflection in the area that in circumstances may be sensitive to deflection during a shaving operation. In alternative examples, the extended portion may extend for other portions of the base portion along the longitudinal axis.

A total height $H_1$, which is the distance measured in the y-direction between an exposed end of the extended portion 150 and the end of the base portion 14 that connects with the bent portion 13, may be in a range of 1.0 to 12 mm, specifically of 2 mm to 12 mm, more specifically of 2 mm to 5 mm and even more specifically about 3 mm. A height $EH_1$, which is a distance measured in the y-direction between the exposed end of the extended portion 150 and the end of the extended portion 150 that connects with the base portion 14, may be in a range of 0.5 to 7 mm, specifically of 1 mm to 7 mm, more specifically of 1 mm to 3 mm, even more specifically of 1.2 mm to 3 mm and even more specifically about 1.6 mm. The length $EL_1$ of the extended portion 150 is a distance measured in the z-direction between exposed side ends of the extended portion 150 and measured orthogonal to the height $EH_1$ of the extended portion 150. The ratio $EL_1/L$ may be between 0.035 to 0,9, specifically 0.05 to 0,2, more specifically about 0,07, wherein L is a total length of the blade measured in the z-direction.

It is also envisioned that a bent blade 200 may have two extended portions 250, which is shown in FIG. 2C. Bent blade 200 is similar the blade 100. As such, like description will be omitted and like reference signs will be used. In this example, the extended portions 250 are the same or substantially the same dimensions. However, it is also envisioned that the extended portions may have different dimensions and may be more than two. The extended portions 250 are positioned on either side of the center along the length of the blade 200 to minimize deflection in the area that in circumstances may be sensitive to deflection during a shaving operation.

A total height $H_2$, which is the distance measured in the y-direction between an exposed end of one of the extended portions 250 and the end of the base portion 14 that connects with the bent portion 13, may be in a range of 1.0 to 12 mm, specifically of 2 mm to 12 mm, more specifically of 2 mm to 5 mm and even more specifically about 3 mm. A height $EH_2$, which is a distance measured in the y-direction between the exposed end of one of the extended portions 250 and the end of the extended portion 250 that connects with the base portion 14, may be in a range of 0.5 to 7 mm, specifically of 1 mm to 7 mm, more specifically of 1 mm to 3 mm, even more specifically of 1.2 mm to 3 mm and even more specifically about 1.6 mm. The length $EL_2$ of one of the extended portions 250 is a distance measured in the z-direction between exposed side ends of one of the extended portions 250 and measured orthogonal to the height $EH_2$ of the extended portion 250. The ratio $EL_2/L$ being between 0.035 to 0,9, specifically 0.05 to 0,2, more specifically about 0,07, wherein L is a total length of the blade measured in the z-direction.

FIG. 2D details another bent blade 300, which is similar to the blade 100. As such, like description will be omitted and like reference signs will be used. Bent blade 300 has one extended portion 350 that includes a shaped portion 352. The shaped portion 352 is positioned on a third plane that is different from the first plane and configured to intersect the first plane. The shaped portion increases the cross sectional surface of the extended portion, thus providing improved resistance to deflection. It is also envisioned that the shaped portion may be inclined and/or straight. The extended portion 350 extends from the center of the length of the blade 300 to minimize deflection in the area that in circumstances may be sensitive to deflection during a shaving operation.

A total height $H_3$, which is the distance measured in the y-direction between an exposed end of the extended portion 350 and the end of the base portion 14 that connects with the bent portion 13, may be in a range of 1.0 to 12 mm, specifically of 2 mm to 12 mm, more specifically of 2 mm to 5 mm and even more specifically about 3 mm. A height $EH_3$, which is a distance measured in the y-direction between the exposed end of the shaped portion 352 and the end of the extended portion 350 that connects with the base portion 14, may be in a range of 0.5 to 7 mm, specifically of 1 mm to 7 mm, more specifically of 1 mm to 3 mm, even more specifically of 1.2 mm to 3 mm and even more specifically about 1.6 mm. The length $EL_3$ of the extended portion 350 is a distance measured in the z-direction between exposed ends of the extended portion 350 and measured orthogonal to the height $EH_3$ of the extended portion 350. The ratio $EL_3/L$ being between 0.035 to 0,9, specifically 0.05 to 0,2, more specifically about 0,07, wherein Lisa total length of the blade measured in the z-direction.

FIG. 3A shows a blade strip 40 that will be formed into a bent blade 400. The blade strip 40 may be disposed along a first plane and comprise a cutting edge portion 412 that is positioned along the length L measured in the z-direction of the blade strip 40. The cutting edge 412 is configured to cut hair. The blade strip 40 may include a base portion 414 that is configured to connect with a razor cartridge (not shown). The blade strip 40 may include a bendable portion 43 intermediate to the cutting edge portion 412 and the base portion 414. The bendable portion 43 is configured to be bent into a bent portion 413.

The blade strip 40 further includes a removable portion 460. The removable portion 460 includes a plurality of perforations or weakening holes 460*a*. The blade strip 40 may be composed of stainless steel, which has previously been subjected to a metallurgical treatment. For instance, the blade strip 1 comprises mainly iron and, in weight: C: 0.48-0.72%; Si: 0.15-0.60%; Mn: 0.20-0.90%; Cr: 12.0-14.7%; and Mo:1.20-1.40%. It is foreseen that other stainless steels may be used without deviating from the scope of the present disclosure. For instance, other materials commonly used for razor blade substrate materials may be used. The cutting edge portion 412, bendable portion 43, base portion 414, and removable portion 460 may be monolithically formed. The blade strip 40 includes an extended portion 450 that is positioned along the first plane and extends from the center of the length of the base portion 414 and is not included in the removable portion 460. Thus, the extended portion 450 will not be removed during forming. The cutting edge portion 412, bendable portion 43, base portion 414, and extended portion 450 may be monolithically formed. The extended portion 450 may extend from the center of the length of the blade 400 to minimize deflection in the area that is most sensitive to deflection during a shaving operation.

When making the bent blade 400 from the blade strip 40, the bendable portion 43 of the blade strip 40 is bent such that the cutting edge portion 412 is positioned along a second plane adapted to intersect the first plane and the base portion 414 remain positioned along the first plane. Subsequently, the removable portion 460 is cut away from or broken off of the base portion 414 via the perforations 460*a*. FIG. 3B details front and side views the bent blade of FIG. 3A after the removable portion 460 is removed. A total height $H_4$, which is the distance measured in the y-direction between an exposed end of the extended portion 450 and the end of the base portion 414 that connects with the bent portion 413, may be in a range of 1.0 to 12 mm, specifically of 2 mm to 12 mm, more specifically of 2 mm to 5 mm and even more specifically about 3 mm. A height $EH_4$, which is a distance measured in the y-direction between the exposed end of the extended portion 450 and the end of the extended portion 450 that connects with the base portion 414, may be in a range of 0.5 to 7 mm, specifically of 1 mm to 7 mm, more specifically of 1 mm to 3 mm, even more specifically of 1.2 mm to 3 mm and even more specifically about 1.6 mm. The length $EL_4$ of the extended portion 450 is a distance measured in the z-direction between exposed side ends of the extended portion 450 and measured orthogonal to the height $EH_4$ of the extended portion 450. The ratio $EL_4/L$ being between 0.035 to 0,9, specifically 0.2 to 0.49, more specifically about 0.32. In this example, the length $EL_4$ is larger than the length $EL_1$ to add rigidity to the bent blade 400 and further minimize undesired blade deflection during a shaving operation. It is envisioned that a bent blade having a plurality of extensions may have any combination of extensions, for example, a blade may comprise extensions that are straight, and/or shaped, and/or wide.

FIG. 4A is a side view of the conventional bent blade of FIG. 1B assembled into a blade cartridge 20 and FIG. 4B is a side view of the bent blade of FIG. 2B assembled into a blade cartridge 20. As can be seen in the comparison depictions, the conventional bent blade 10 deflects more in the y-direction than the bent blade 100 when contacting hair H during a shaving operation, these are respectively shown as Y0 and Y1. It is further shown that the conventional bent blade 10 deflects more in the x-direction than the bent blade 100 when contacting hair H during shaving operation, x-direction deflections are respectively shown as X0 and X1 in FIGS. 4A and 4B. This is due to the extended portion 150, 350, 450 that extends from the center of the blade to minimize deflection in the area that is sensitive to deflection during a shaving operation. In examples, this may be due to the extended portions 250, which are positioned on either side of the center along the length of the blade 200 to minimize deflection in the area that is sensitive to deflection during a shaving operation. It is envisioned that both sides of the bent blade extension(s) 150 may or may not be in direct contact with the blade cartridge 20. Shown in FIG. 4B are pattered blocks B and C which depict sections of the cartridge 20 that are proximate to the base portion 14 and the extension 150. In aspects, pattered block B is a part of the cartridge and is in contact with the base portion 14, whereas pattered block C is a void and thus both sides of the extended portion 150 are not in contact with the cartridge 20. In aspects, pattered blocks B and C are both a part of the cartridge 20 and are in contact with both sides of the base portion 14 and extended portion 150. An aspect of having both sides of the extended portion 150 contacting the cartridge 20 is that it provides for an increased rigidity of the blade 100.

In some examples, the increased rigidity may allow for the use of blade strips having a reduced thickness, thereby reducing the amount of material involved. Typical blade strip thickness may range from 0.15-0.1 mm. Blades with increased rigidity may allow for blade strip thickness to be below 0.1 mm. In examples, blade thickness may be between 0.08-0.05 mm. Particularly 0.074 mm.

In examples wherein the extended portion includes a shaped portion, the shaped portion may comprise an inclined surface, or a curved surface, which may be formed by bending or by stamping process. In some of these cases, a curved surface in the same plane as the extended portion may be provided. I some cases, an inclined surface along a plane that is different from that of the extended portion may be provided. Combinations of these shaped portions may be provided in some examples.

FIG. 5 is a graph depicting Finite Element Analysis strength test results of various bent blades. The graph shows the correlation between a force (grF) applied on the cutting portion of a bent blade in the x-direction and the amount of displacement in the y-direction (mm) for the conventional bent blade 100, the "narrow extension" bent blade 200, and the "wide extension" bent blade 400. The results show that the both the narrow and wide extensions suppress or minimize the blade displacement in the y-direction when compared to conventional bent blades.

The invention claimed is:

1. A razor blade extending along a longitudinal axis L, the razor blade comprising:

a cutting edge portion positioned along a second plane, a base portion positioned along a first plane that is different from the second plane, wherein the first plane intersects the second plane at an angle, the razor blade further comprising a bent portion intermediate to the cutting edge portion and base portion, and an extended portion extending from the base portion away from the second plane, wherein at least a first portion of the extended portion is positioned along a third plane that is different from the first plane and the second plane, wherein a plurality of protrusions extend from the base portion away from the second plane, wherein the extended portion extends farther from the base portion than the plurality of protrusions, wherein the cutting edge portion extends a first length along the longitudinal axis L, wherein the extended portion extends along a second length along the longitudinal axis L, wherein the second length is less than the first length, wherein the cutting edge portion, base portion, bent portion, and extended portion are monolithically formed, wherein the extended portion extends away from the base portion a distance of 1.6 mm, and wherein a total height of the base portion and the extended portion is within a range of 2.0 mm to 12 mm.

2. The razor blade according to claim 1, wherein a thickness of the razor blade is between 0.1 mm and 0.05 mm.

3. A method of manufacturing a razor blade comprising:

providing a strip having a cutting edge portion, a base portion, a bent portion intermediate to the cutting edge portion and base portion, an extended portion, and a removable portion, wherein perforations are provided along a length L of the strip positioned within the removable portion and adjacent to the extended portion and to the base portion; and separating the removable portion from the base portion and extended portion by cutting the strip at a point where the removable portion starts, wherein the extended portion extends away from the base portion farther than a plurality of protrusions extending from the base portion created by the perforations, wherein the extended portion extends away from the base portion a distance of 1.6 mm, and wherein a total height of the base portion and the extended portion is within a range of 2.0 mm to 12 mm.

4. The method of claim 3 further comprising:

forming the extended portion to include a shaped portion.

5. The method of claim 4, wherein the extended portion is positioned along a first plane.

6. The method of claim 5, wherein the shaped portion is positioned along a third plane that is different from the first plane.

7. The method of claim 3, wherein the razor blade includes two extended portions, and wherein each of the two extended portions is offset from a center of the length L of the razor blade along a longitudinal axis.

8. The method of claim 7, wherein at least one of the two extended portions has an approximate length along the longitudinal axis of 1.4 mm.

9. The method of claim 3, wherein the extended portion is centered along the length L of the razor blade along a longitudinal axis.

10. The method of claim 3, wherein a thickness of the razor blade is between 0.1 mm and 0.05 mm.

11. A razor blade extending along a longitudinal axis L, the razor blade comprising:

a cutting edge portion positioned along a second plane, a base portion positioned along a first plane that is different from the second plane, wherein the first plane intersects the second plane at an angle, the razor blade further comprising a bent portion intermediate to the cutting edge portion and base portion, and an extended portion extending from an edge of the base portion away from the second plane, wherein a plurality of protrusions extend from the edge of the base portion away from the second plane, wherein the extended portion extends farther from the edge of the base portion than the plurality of protrusions, wherein the cutting edge portion, base portion, bent portion, and extended portion are monolithically formed, wherein the extended portion extends away from the base portion a distance that is within a range of 1.6 mm to 7 mm, and wherein a total height of the base portion and the extended portion is within a range of 2.0 mm to 12 mm.

12. The razor blade according to claim 11, wherein the extended portion has a length along the longitudinal axis L that is between 0.035and 0.9 of a length L of the razor blade along the longitudinal axis L.

13. The razor blade according to claim 11, wherein the extended portion has a length along the longitudinal axis L is between 0.05 and 0.2 of a length L of the razor blade along the longitudinal axis L.

14. The razor blade according to claim 11, wherein the extended portion is centered along a length L of the razor blade along the longitudinal axis L.

15. The razor blade according to claim 11, wherein the razor blade includes two extended portions.

16. The razor blade according to claim 15, wherein each of the two extended portions is offset from a center of a length L of the razor blade along the longitudinal axis L.

17. The razor blade according to claim 15, wherein at least one of the two extended portions has an approximate length along the longitudinal axis L of 1.4 mm.

18. The razor blade according to claim 11, wherein at least a first portion of the extended portion is positioned along a third plane that is different from the first plane and the second plane, and wherein a second portion of the extended portion which is different than the first portion of the extended portion is positioned along the first plane.

19. The razor blade according to claim 11, wherein at least a first portion of the extended portion extends from the edge of the base portion in a direction different than the plurality of protrusions.

20. The razor blade according to claim 11, wherein a thickness of the razor blade is between 0.1 mm and 0.05 mm.

* * * * *